United States Patent Office

3,479,423
Patented Nov. 18, 1969

3,479,423
METHOD OF FORMING COMPACTED GRAPHITE BODIES
Cornel Wohlberg, Greensburg, Pa., assignor to the United States of America as represented by the United States Atomic Energy Commission
No Drawing. Filed Dec. 11, 1967, Ser. No. 689,298
Int. Cl. C04b *35/54*
U.S. Cl. 264—122  1 Claim

ABSTRACT OF THE DISCLOSURE

A method of forming coherent solid bodies of graphite in which a small mole ratio of transition metal is added to the graphite, thoroughly mixed, and compacted.

---

The invention described herein was made in the course of, or under, a contract with the U.S. Atomic Energy Commission.

The inventor has observed that on cold pressing graphite powder in a steel die adhesions of graphite form on the steel. From this observation the inventor postulated that some sort of intercalation mechanism, that is, a mechanism of electron transfer between solid metal and graphite, is in operation and gives rise to a lamellar type of compound. The process of this invention is directed to a method of preparing a graphite article in which the graphite powder is mixed with the powder of a transition metal such as niobium or manganese, the atomic ratio of graphite to metal being at least 100 to 1, and then compacting the said mixture by any well known method. Without the addition of the metal the inventor has found that graphite powder is incapable of forming a coherent solid by mechanical compaction. The article resulting from the practice of this invention has substantially altered the electrical and thermal properties and would have specific applications for use as construction material in nuclear reactors. Accordingly, using the method of this invention, graphite bodies can be made out of dry mixes which would have a number of distinct advantages, namely, (1) no handling of viscous semifluids; (2) no long baking cycles; (3) no noxious organic fumes to be eliminated; (4) one hundred percent carbon yield; (5) greater density, uniformity, and strength; and in general, more predictable physical properties; and (6) lower cost.

It is therefore the principal object of this invention to provide a method of forming a coherent carbon body with a graphite powder having undergone no previous preparation such as graphitizing.

Another object of this invention is to provide a process in which a very small amount of a transition metal is thoroughly mixed with a graphite powder and compacted, thus forming an adherent graphite body.

A further object of this invention is to provide a process for making graphite bodies of uniform properties by a method that is inexpensive and free of the objectionable features (air contamination, etc.) of conventional graphite practice.

Other objects and advantages of the invention will become known from the following description of a preferred embodiment of the invention.

The mixture is 1 gram atom of graphite powder and 0.01 gram atom of niobium metal powder (greater than 325 mesh). The metal powder and graphite are tumbled in an appropriate mixing container for a period of about 2 hours and then mixed powders are placed in a steel die and cold pressed to about 30,000 p.s.i. The resulting pellet gives compressive strengths of approximately 500 p.s.i.

Another embodiment of this invention is to mix 1.0 gram atom of graphite powder with 0.01 gram atom manganese powder (greater than 325 mesh). The powders are mixed and compressed as in the above embodiment. The pellet of this mixture yields compressive strengths of about 1700 p.s.i.

Basically, the method of this invention involves first mixing the carbon or graphite powder with a transition metal selected from the periodic table and is defined as any metal that is an electron donor, e.g., niobium and manganese.

Using the process of this invention, it has been shown that transition metals in low atomic ratios to the amount of carbon present are effective in making of compacts of graphites or carbons that have increased coherence and strength over graphites prepared using the well-known methods of adding pitch and binders, cold pressing, and then baking at an elevated temperature in order to vaporize the said binders. An important feature of this invention is that the compaction is made cold, and that no baking or heating is necessary to achieve a coherent pellet. However, the pellets made using the procedure of this invention could be heated to some temperature below the melting point of the metal additive and thereby increase the diffusion of the metal atoms through the graphite or carbon structure. Although carbide formation is certainly not a prerequisite for the process of this invention, the use of carbide formers and carbiding temperatures in the process of this invention is contemplated. Another novel feature of the above process over the prior art is that the metal additive may be present in ratios very much below those required for the formation of stoichiometric carbides.

Various features of the invention are set forth in the appended claim. In the claim, the term graphite should be construed to mean carbon in any of its forms, e.g., amorphous carbon, carbon in crystalline form.

Therefore the inventor has discovered that transition metals, in particular, donate electrons to graphite and change the electronic structure of the latter. Increases in strength and the cold "cementing" of graphite to graphite is accomplished. Thus, this invention makes possible cold pressing of graphite bodies with appreciable strength using relatively small atom ratios of metal powders.

What is claimed is:
1. A method of preparing a graphite article in which graphite powder is mixed with a metal powder and thereafter mechanically compacted, wherein the improvement comprises the selection of one metal from the group consisting of niobium and manganese, said metal being present in the graphite in the ratio of about 1 atomic weight of said metal to 100 atomic weights of said graphite powder.

References Cited

UNITED STATES PATENTS 3,011,960  12/1961  Williams et al. _____ 264—105
3,291,872  12/1966  Brown et al. _____ 264—29

ROBERT F. WHITE, Primary Examiner
J. R. HALL, Assistant Examiner

U.S. Cl. X.R.
264—105